Sept. 20, 1971  S. POSTELSON-APOSTOLESCU  3,606,208
FLYING PLATFORM-AUTOMOBILE BOAT AND AIR
SUSPENSION CAR COMBINATION
Filed Dec. 11, 1968  3 Sheets-Sheet 1
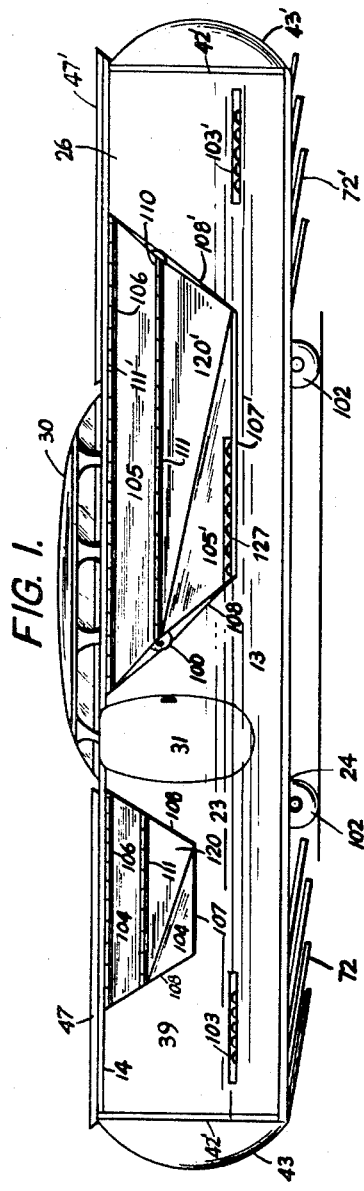
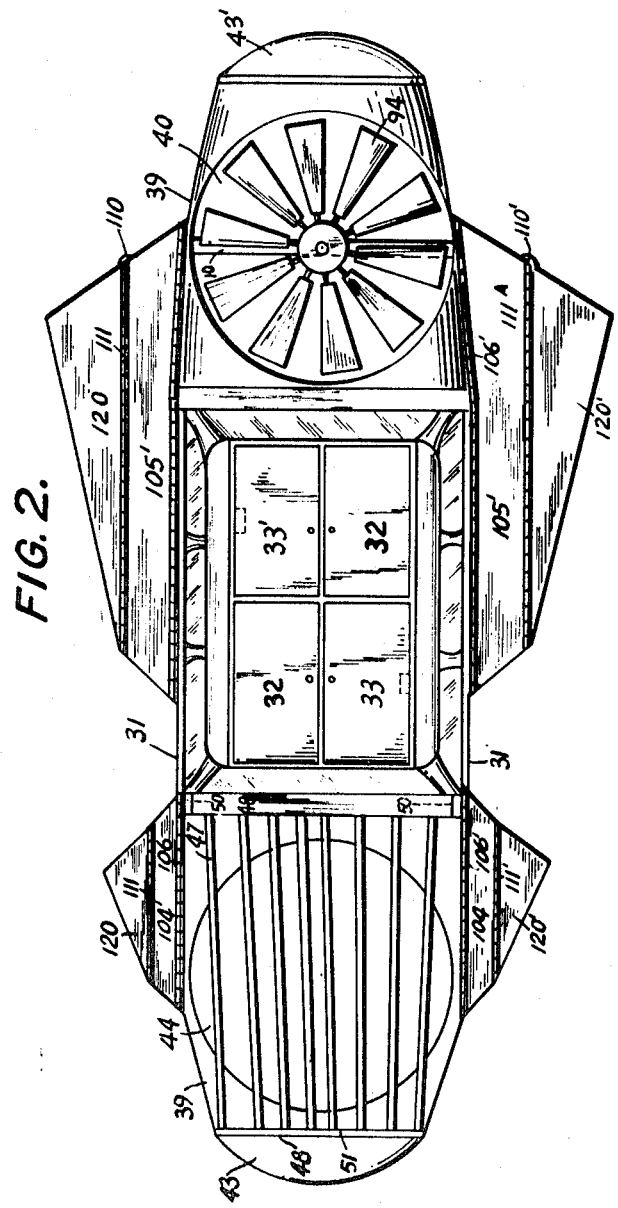
INVENTOR.
STEVEN POSTELSON APOSTOLESCU

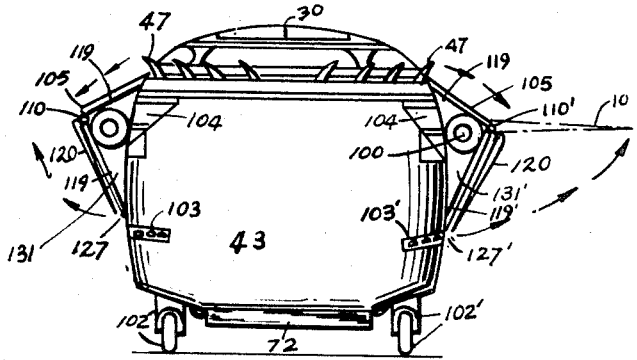

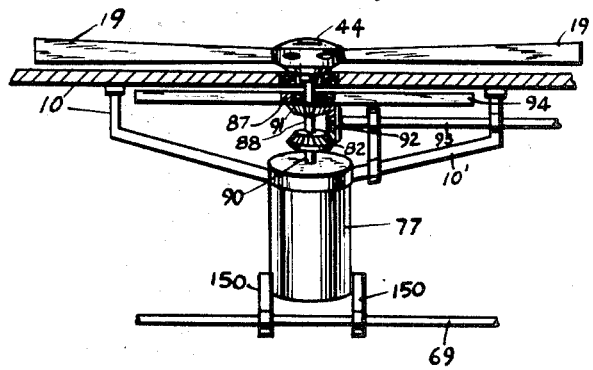
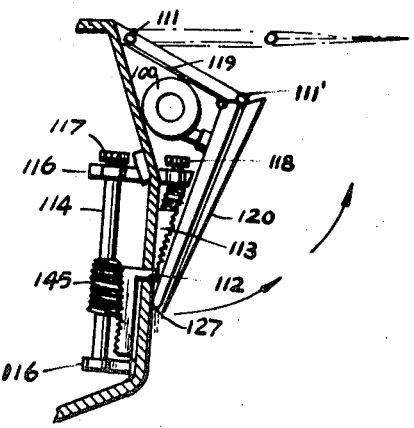
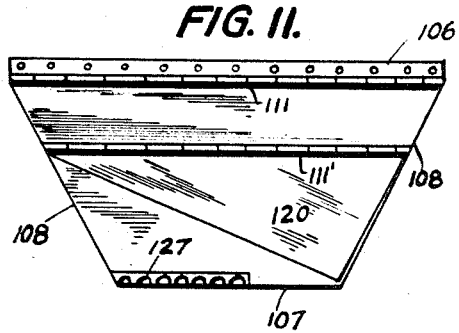
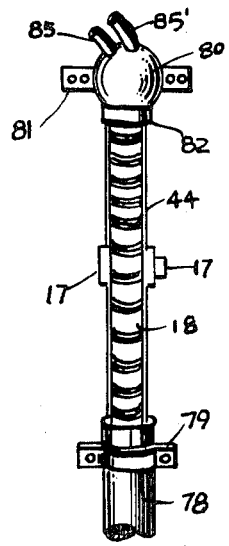
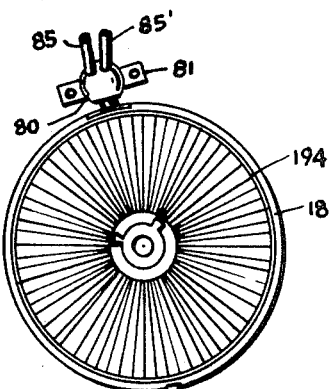
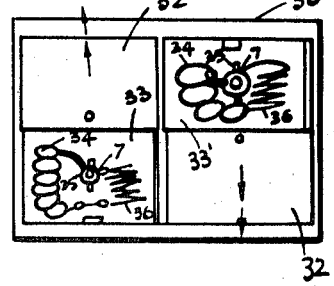
INVENTOR.
STEVEN POSTELSON APOSTOLESCU

United States Patent Office 3,606,208
Patented Sept. 20, 1971

3,606,208
FLYING PLATFORM-AUTOMOBILE BOAT AND AIR SUSPENSION CAR COMBINATION
Steven Postelson-Apostolescu, 419 W. 35th St., New York, N.Y. 10001
Filed Dec. 11, 1968, Ser. No. 789,640
Int. Cl. B64c 27/20
U.S. Cl. 244—7       12 Claims

ABSTRACT OF THE DISCLOSURE

An aircraft having an elongated fuselage, angular sectionalized wings mounted on the side wall of the fuselage, and the front wings being smaller than the rear wing. A wing member is hinged on each of the larger and smaller wings and including means to tilt the wing member upward or downward for additional lift. The wings having a passage extending therethrough in which a jet engine is mounted and means to exhaust gas from the jet engine rearward, downward and into the horizontally directional vents. The fuselage being provided with rotor blade and motive means for ground effect and normal flight including means for controlling the direction of flight.

---

This invention relates generally to aircraft and more particularly to a combination aircraft-automobile-boat and air suspension car (hovercraft) combination which can fly, travel over the land-highways and over water with equal facility, wherein the operator of the vehicle may be provided with selective controls for guiding the movement, speed and direction of the vehicle under all conditions.

The invention contemplates a vehicle that is compact and capable of flying with great facility and great speed and provided with great lifting power, in any medium such as air, land or water, and readily and automatically convertible from one use to another without loss of time or necessity of getting out of the vehicle.

Another object of the invention is to provide an aircraft which is called a flying platform but which is a combination of four different vehicles in one and can be instantly converted from one type to another type of vehicle and perform with ease in any mode.

Still another object of the invention is to provide the flying platform with four sets of angular wings; two smaller and two larger, one small and one large on each side of the fuselage, the larger wings being hinged on the side of the fuselage, an auxiliary expanding wing is hinged on the side of the larger and smaller angular wings.

Another object of the invention is to provide a turbo fan type rotor that is driven by jet gases and by a new type rocket engine and also provide a modified rotor system that is co-axially mounted of a different diameter and turns at opposite directions.

Still another object of the invention is to provide a vehicle of this kind with additional means to control direction of the aircraft when flying or hovering over the land or water comprising two sets of horizontal vents on each side of the fuselage front and two sets of horizontal vents at the rear side of the fuselage. These sets of vents are connected by flexible pipe to the jet engines and the air chamber.

Yet another object of the invention is to provide a vehicle of this type a parachute at the top of the middle section of the fuselage that is adapted to eject automatically by a rocket. This object of the invention is to permit the vehicle to land safely in emergency situations.

Still another object of the invention is to provide an aircraft that is capable of traveling in any medium, land, water, air, ice or snow, slowly or at great speeds and on the air suspension principle.

Another object and advantage of the invention will be apparent from the description thereof to follow, taken in connection with the accompanying drawings wherein;

FIG. 1 is a side elevational view of an aircraft embodying my invention,

FIG. 2 is a top plan view thereof,

FIG. 3 is a front view thereof,

FIG. 4 is a top view of the top rotor fins, some being straight and others being oval, on their respective frames, FIG. 5 is a front view of a modified type of oval fins and mechanism that raise or lower the front fins, FIG. 6 is a side view of the angular larger wing with its auxiliary expanding wing member hinged on and the jet engine and mechanism that expand or retract the auxiliary wing member, FIG. 7 is another side view of the large angular wing with the expanding auxiliary member turned on the top of the angular wing, also showing at the lower part of the angular wing, the jet engine, exhaust pipe and the outlet opening through which the jet gases flow downward through the wing channel against vents and atmosphere to stall the failing of the aircraft in case of emergency, FIG. 8 is a front sectional view showing the fin sets, side air chambers, vents, at the bottom and side horizontal vents with pipe connecting to the jet engines and air chamber, FIG. 9 is a front view of a modified co-axial rotor unit and engine, FIG. 10 is an enlarged sectional view of the larger wing and auxiliary wing member in folded position, including jet engine and mechanism to raise or lower the whole large annular wing, FIG. 11 is a side view of the small wing, FIG. 12 is a view of the side of the turbine drive for the rotor blades with the rocket engine and gas pipe from the jet engine that drives the turbofan rotor, FIG. 13 is a top view of the turbofan rotor of the turbine and rocket engine and jet gas pipe, FIG. 14 is a view of the rocket engine partially showing the interior of the rocket chamber, FIG. 15 is a view of the top of the passenger cabin showing the parachute compartment and sliding doors, and FIG. 16 is a front view of the parachute compartment, door springs and latch to keep doors closed.

Referring in detail to the drawings, there is seen an aircraft designated generally as 13 embodying my invention. The aircraft comprises an elongated fuselage or body 14 simulating the form of an automobile, including merging curved side walls 23, bottom wall 24, top 26 and end walls 43, 43', respectively, all defining an interior cabin 26. An opening in the center of the top wall 25 is closed by a dome-shaped structure 30 and a door 31 is provided on each side wall 23.

A pair of compartments 33 and 33' are provided in the top dome-shaped structure 30. Slidable doors 6 cover each of the compartments 33 and 33'. Each door 6 is tied to rings 35–35'. A wire 36 is tied between ring 35–35', and a ring on rocket 7. The slidable doors are opened by a latch 4–4' and spring 3–3' fitted on each of the doors 6–6'.

The interior of the fuselage is divided into three sections; the portion beneath the central dome-shaped structure comprises a cabin in which is located the pilot and passenger sections, and a front section 39 and rear section 39' in each of which is located the motive means. Rotors 44 and 44' are mounted in each section 39–39' on frames 10–10' respectively. In the fuselage front and rear section 39 and 39' are defined chambers 40 and 40' formed by a pair of longitudinal directed vertical walls 41 and 41' and a pair of transverse vertical walls 42 and 42'. Outwardly of the vertical walls 42 and 42' are front and rear nose sections 43 and 43'.

The top and bottom walls of the front and rear sections 39 and 39' have openings 40–40' leading into chambers 40–40' in which are mounted frames 10–10'. Secured to the frames 10 (10') within each section 39 (39') respectively are rotors 44 (44'). Sections 39 (39') are covered by fins mounted in a frame 48 (48') set within the opening 40. The fins may be made of different shapes such as the straight shape 47 (47') shown in FIG. 4 or the oval shape 49 (49') as shown in FIG. 5.

The rear end of the frame 48 (48') is hinged to a bracket 50 while the front end is hinged to a second bracket 51 fastened on the top of the fuselage openings 40 (40'). The front of the frame 48 is provided with a hollow bushing 52 in which the head 53 of shaft 54 is seated. The shaft 54 passes through a bracket 55 and engages a gear 56. When gear 56 turns, the shaft 54 turns in the hollow bushing 52. Turning the gear 56 to the right raises the front of the frame 51 and consequently the fins 47 (or fins 49). Turning the gear 56 to the left, lowers the frame and fins 47 (49).

The fins 47 (47') or fins 49 (49') are each tilted in a manner shown in FIG. 4 by a gear 58 (58') engaging a threaded shaft section 59 (59') on frame 48. A central shaft 61 is set within frame 48 and has a gear 62 at one end engaging a gear 63 (63'). A second gear 64 is fit on the outer end of the shaft 61. Turning shaft 61 through gear 64 causes gear 63 (63') and shafts 59 (59') to turn gears 58 (58') which consequently will tilt-fold fins 47 (47') [or fins 49 (49')], half to the left and half to the right, thus closing the opening 40 (40'). In this way it is possible to control the air intake through the opening 40 (40') created by the rotors 44 (44') [or rotors 17 (17')] to permit an efficient operation of rotors at any speed without the danger of overturning the aircraft. The oval shaped fins 49 (49') seen in FIG. 5 will also permit a constant and controlled air intake at all speeds which will provide a constant lift in flight.

Turning to FIG. 8 the interior of the front and rear section 39 (39') are provided further with a triangular array of three sets of fins. Two sets of fins are mounted longitudinally immediately under rotors 44 (44') as a divided pair 101 (101') set on angular shafts 65 (65'). The two sets of fins 101 and 101' are directed in opposite directions so that when they are folded downward they close the air passage through chamber 39 (39'), and direct the air sideward into an air chamber 66 (66') surrounding the opening 39 (39') and against vents 67 (67') which open outward into the atmosphere providing the cushion-suspension to travel over land or water. A second set of fins 68 are moveably mounted longitudinally on a shaft 69 and are swingable transversely to provide direction to the aircraft. The third set of fins 72 is transversely mounted at the bottom of the aircraft on bushings 73 (73') and are tilted backward and forward by shaft 75 and gears 74 (74'). Tilting of fins 72 backward causes the aircraft to move backward, keeping fins 72 straight the aircraft will raise up, tilting forward will cause forward movement. A complete description of these fins is made in another patent issued on Aug. 9, 1966 under 3,265,329 to the same inventor.

Each rotor 40 (40') is driven by a turbine system as seen in FIGS. 12 and 13, the rotor system of the turbofan type comprising a central rotor hub 17 (17') with multiple blades 94 (94'). Driven by the jet gases from a jet engine 100 (100') through pipe 78 (78') fixed on bracket 79 (79') and by a rocket engine 80 (80') mounted on bracket 81 (81'). The rocket engines 80 (80') and jet gas pipes 78 (78') lie contiguous to a ring like turbine rotor 18 (18') fixed about a hub 17 (17'). The gas pipe 78 (78') is connected at its outer end to jet engines 100 (100'), thus, when gases from jet engines 100 (100') and rockets 80 (80') hit the buckets 86 (86') of the ring like turbine 18 (18'), the hub 17 (17') is forced to turn and drive the blades, providing lift and speed. The air created by the blades 94 react with fins 72 (72') as noted earlier.

The rocket engine 80 (80') has a hollow chamber 83, and an opening 84 at its lower bottom end. The pipe 85 (85') located at the top of the hollow chamber rocket 80 (80') allows two separate liquid chemicals to enter the rocket chamber 83 which, when mixed, explode. The pressure of the exploding gases go against the buckets of the turbine rotor 18 (18') turning the entire rotor system. This rocket combination will provide a normal function of rotors at all times and especially in emergency landings. The rocket engines are secured on brackets 81 (81') which brackets will be mounted on the side of the fusealge top openings.

As seen in FIG. 9, the rotor 44 (44') may be modified so that it can be combined and used in a single unit with conventional airplane blades in a coaxial contrarotating unit. The rotor blades 19 (19') of the conventional helicopter type are fixed in the hub about the rotor 44 (44'). A set of small blades 94 are fixed to the lower rotor 87. A shaft 88 extends downward from the lower rotor 87 and at its lower end there is mounted a gear 89 secured to the engine shaft 90. Another gear 91 is mounted on the lower rotor bottom 87. Both gears 89 (89') engage another gear 92 mounted on shaft 93 and journalled in frame 10. A conventional combustion engine 77 rotates the shaft 90 so that in this combined arrangement the rotor 44 and rotor 87 will turn counterrotatingly. The two rotors 44 and 87 may have only two blades each or three if desired. This arrangement permits a higher rate of lift and consequently higher speed.

The front and rear sections 39 (39') of the fuselage 13 have double side walls 41 (41') which combine with walls 23 (23') of the fuselage to enclose completely an exterior section on each side of the aircraft where air or water can not enter. The walls 42 (42') are made of two bulkheads which enclose an air chamber 66 (66') with vents 67 (67') at the bottom wherein the compressed air from the rotors vents into atmosphere providing the air suspension phenomena.

A pair of landing gear structures 102 (102') are provided. The structures comprise two wheels at the front and two wheels at the rear of the aircraft hingedly mounted at the bottom wall 24.

Four sets of horizonal vents 103 (103') are located, two on the front side of the fueslage and two at the rear side of the fuselage body 13. Pipes 115 (115') connect at one end to the horizontal vents 103 (103') and at other end to the exhaust through pipe 128 (128') of the jet engine 100 (100'). Another pipe 153 (153') is connected at one end to the horizontal vents 103 (103') and at the other end to the chamber wall 41 (41') to force compressed air from the air chamber 66 (66') against vents 103 (103'). Thus, the needed means for directing the aircraft jet gases from jet engines and compressed air source to the side horizontal vents is provided.

On each side wall 23 (23') of the fuselage there is mounted a small wing structure 104 (104'). A larger wing structure 105 (105') is also mounted at the middle rear portion of the fuselage. Each wing structure 105 (105') in side elevation, as seen in FIG. 8 and FIG. 10, is generally rectangular in shape with an elongated straight top edge, straight but shorter straight middle and bottom edges 107 (107') [as viewed in FIG. 1] and slanting end edge 108 (108'), as seen in FIGS. 6 and 7. Midway of the top and bottom, each wing bulges outwardly of the body as indicated at 109 (109') and as seen in FIGS. 8 and 10. The top of the wing structures 105 (105') are hingedly mounted on the side walls 23 (23') by a flange 106 (106') which is fastened thereto. At the wing structure bulge 109 (109'), another hinge 111 (111') is mounted on the edge of the wing structure 105 (105'). The lower part of which has on rack 112 (112') and a rack 113 (113') which move up or down the wing 105 (105') through shaft 114 (114') and worm gear 145 (145') on frame 116 (116'. The shaft 114 (114') with the worm gear 145 (145') is manually or mechanically turned by gear 117 (117'). The rack 113 (113') with shaft and worm gear 121 (121') and gear 118 (118') is identical to the rack 112 (112'), the shaft 114 and the gear 145 FIG. 10.

The wings 105 (105') have double walls 119 (119') on which the mechanisms to operate the wings are located. An auxiliary wing member 120 (120') is mounted on hinges 111' to freely move up or down. The movement is accomplished by a gear 124 (124') mounted on the lower end of the wing member 120 (120') where the hinges 111 (111') are. A shaft 121 (121') is transversely mounted on a bracket 122 (122') on the top section of wing 105 (105') and a worm gear is mounted at the other end of shaft 121 (121') to engage worm gear 124 (124'). Another gear 125 (125') is mounted at the end of shaft 121 (121'). By turning gear 125 (125') shaft 121 (121') turns and because of the engagement of gear worm 123 (123') with worm gear 124 (124') the wing structure member 120 (120') will tilt or flap upward or downward according to the necessity.

The lower part of wing 105 (105') has double walls 119 (119') (FIGS. 8 and 10), a channel 126 (126') and vents 127 (127') at the lower end of the lower part of wing 105 (105'). An exhaust pipe 128 (128') having an opening 129 is provided. A plate 130 is slidably mounted on pipe 128 so that when closed, it directs the gases from jet engines 100 (100') backward but when opened, directs the gases downward into the channel 126 and vents 127 and into the atmosphere to stall the falling of the aircraft in great emergency or to provide additional lift.

The smaller wings 104 (104') located at the side front of the fuselage 13 are similar to wings 105 (105') in construction but the top and lower end of the wing 104 (104') are fixedly fastened to the side panel of the fuselage 13. The auxiliary wing member 102a of the small wing has the same mechanism to tilt or flap it up or down similar to that in wings 105 (105').

Between each wing structure 105 (105') and walls 24 (24') there is an opening 131 (131') where the jet engine 100 (100') is mounted which in flight will provide additional lift. The auxiliary wing member 120 (120') provides extra lift to the lift provided merely by wing 104 (104') or 105 (105').

The jet engine 100 (100') is mounted on the inner surface of the wing structure 105 (105') in the opening 131 (131'). Each engine 100 (100') as seen in FIG. 7 has a fuel inlet pipe 100a and exhaust pipe 100b. Two conventional aircraft gas engines 77 (77') shown in FIG. 9 are mounted vertically under motor 44 (44') on brackets 150 (150') that rest on a cross shaft 69 (69'). The engine gear 82 engages a gear 92 on the shaft 93 and the third gear 91 mounted on the lower rotor 87 bottom. Shaft 93 also extends to the rear of the fuselage 13 and joins each of the engines together, that is, it engages gear 92' and shaft 93' and gears 82' and 91' associated with rear rotor 44'. Because of the similarity of mechanical arrangements such duplicate drawings have not been made. This arrangement provides that the engine 77 will drive both the forward and rear blades, etc. in unison. Likewise, the jet rotors will drive both the forward and rear blades in unison. The two drive means provide a safety measure in the event either the engine 77 or engine 44 fails. The pipes 3 (3') front jet engines 100 (100') are auxiliary pipes that connect with the turbofans ring like rotor 18 (18') to drive them through the gas pressure from jet engine 100 (100').

The passenger cabin top 30 is provided with two compartments 33 (33') covered with slidable doors 32 (32') on each side. Parachutes 34 (34') are mounted on rings 7 (7') in each of the compartments 33 (33') one end of the parachute 34 (34') are attached to a rocket 35 (35'). When doors 32 (32') are closed, they are secured by latch 4 (4') with a handle 6 (6'). A spring 3 (3') is connected at one end to the door frame 30 and at the other end to the sliding door 32 (32') inside the compartment. When latch 4 (4') is released through handle 6 (6') the spring 3 (3') will automatically slide the door 32 open causing the rocket 35 to blow the parachute out of compartment 33 (33') permitting a safe landing of the aircraft in an emergency.

In operation, when the vehicle is on the ground, the top of the rotors are closed by the fins. When the engines are started, the top fins are opened to permit the air to be pushed inside and against the fins, inside the front and rear opening. This causes the aircraft to rise up. The lower bottom fins are kept vertically straight and when it is desired to move forward, the bottom fins are pushed forward. (Pushing the fins back, the aircraft will move backward.) The longitudinal control of the aircraft is provided by varying the angles of the bottom fins when in full flight. The direction of the vehicle is also accomplished by operating the horizontal vents on each side of the fuselage; opening the right side vents will turn the vehicle to the left, opening the left side vents will turn the vehicle to the right.

The vehicle can be used as an air suspension craft to hover over land or water at high speed by just tilting the first fins set on the inside of the opening that close the vertical passage of the air but direct the air instead into the side air chamber and vents at the bottom and into the atmosphere which will provide the air suspension phenomena.

The vehicle is readily convertible also for road travel as an automobile or by water as a boat. On land, the rear wheels of the vehicle are connected to the longitudinal shaft connecting the front and rear rotors so that the rear wheels of the vehicle will automatically turn. On water, the rotors will turn at a slower rate forcing the air against bottom fins. When the fins are tilted in one or other way, the vehicle will move forward or rearward.

When in full flight with only the compressed air power, the vehicle will move at a slower rate. However, by starting the jet engines the vehicle will double or triple its normal speed. In order to obtain a proper flight, the top fins are lowered so that half of the fins extend to the right and half to the left. Even in this position, the air still enters the rotors, thus providing constant lift to the vehicle to permit the jet engines to provide greater push and to obtain greater speed to the vehicle. The auxiliary wing members will be opened, i.e., expanded, when extra lift is needed and when the vehicle will fly at high speed to provide that extra lift necessary for high performance of the vehicle in flight.

The vehicle can land vertically as a helicopter does or in a horizontal angle as an airplane does. When landing like an airplane, the wing members are to be kept extended. In case of any emergency, the rotors and wings can be operated and the vehicle will land safely. By reversing the gas jets, the vehicle can be made to go backward or downward, preventing falling of the vehicle.

Another way of landing the vehicle safely is by way of the parachute located at the top of the passenger cabin that can be released instantly in great emergency and when all other means fail to operate.

In snow or ice the vehicle can be adapted with suitable skis and will be driven by air suspension phenomena.

While I have illustrated and described the preferred embodiments of my invention, it is to be understood that I do not limit myself to the precise construction herein disclosed and the right is reserved to all changes and modifications coming within the scope of the invention as defined by my appended claims.

What is claimed is:
1. In an aircraft of the type described,
(a) an elongated fuselage having top, bottom, side and end walls and being formed at the front and rear thereof with respective openings extending through said top and bottom walls and spaced from the side walls;
(b) a rotor blade assembly mounted within said fuselage openings for rotation about a common axis of the opening and of the assembly;
(c) drive means for rotating said rotor blade assemblies about the respective axes to generate an air stream in each opening in a direction from said top wall to said bottom wall;
(d) a pair of wings arranged on each side wall one behind the other formed with respective passages therethrough in a direction substantially parallel to said side walls, the rear wings being larger than the front wings; and
(e) a jet engine in the passage of each rear wing to discharge a gas, the improvement wherein;
(f) each of said front wings comprise inner and outer sections, the inner section of which is fixed to said fuselage, the outer section of which is hingedly secured to said inner section, each of said rear wings comprising inner and outer sections, the inner section of which is hingedly secured to said fuselage and to outer section of which is hingedly secured to said inner section, and means for raising and lowering each of said hinged wing sections to extend or retract said wings for predetermined flight characteristics.

2. The arrangement as claimed in claim 1, wherein each of said inner wing sections comprise a first portion extending angularly to said fuselage and a second portion extending substantially parallel to said fuselage, said second portion being connected to said first portion and to said fuselage to form a unitary cover thereover, said hinged outer section of each wing being hinged at the connection between said first and second portions.

3. The aircraft according to claim 2 including means for raising and lowering the first portion of the inner sections of said rear wings comprises a rack mounted on the inner surface of the associated second portion thereof, a pinion rotatably mounted within said fuselage, and means interconnecting said rack and pinion whereby rotation of said pinion causes said wings to pivot about their hinge connections.

4. The aircraft according to claim 1 wherein the means for raising and lowering the outer wing sections comprises a gear connected to the hinge of said outer wing section and a rotatable screw member extending into engagement therewith and mounted within the inner wing member.

5. The aircraft according to claim 1 wherein each rotor includes an air turbine assembly comprising a rotor and a stator housing, a conduit connecting said stator and the discharge of said jet engine, said conduit delivering the discharge of the engine to said rotor, means connecting said rotor to a blade assembly and means for selectively controlling passage of said discharge through said conduit.

6. The aircraft according to claim 5 wherein each rotor includes a gaseous rocket engine comprising a chamber, a source of at least two independent gaseous fuel and conduit means connecting each source to said chamber, said chamber being mounted adjacent said rotor and provided with port means to deliver the discharge of said gaseous engine thereto.

7. The aircraft according to claim 2 wherein each second portion of said inner wing sections are formed with at least one channel extending substantially vertically therein, and an exhaust port located along the lower edge of said second section and communicating with said channel, said channel communicating at its upper end with the discharge of said jet engine and means for selectively directing said discharge through said channel to provide said aircraft with lift.

8. The aircraft according to claim 2 wherein said fuselage is provided with side vents directed in a horizontal direction of aircraft, conduit means connecting said vents with the discharge of said jet engine, and means for selectively directing said discharge through said vents.

9. In an aircraft of the type described,
(a) an elongated fuselage having top, bottom, side and end walls and being formed at the front and rear thereof with respective openings extending through said top and bottom walls and spaced from the side walls;
(b) a rotor blade assembly mounted within said fuselage openings for rotation about a common axis of the opening and of the assembly;
(c) drive means for rotating said rotor blade assemblies about the respective axes to generate an air stream in each opening in a direction from said top wall to said bottom wall;
(d) a pair of wings arranged on each side wall one behind the other formed with respective passages therethrough in a direction substantially parallel to said side walls, the rear wings being larger than the front wings; and
(e) a jet engine in the passage of each rear wing to discharge a gas; and
(f) a selectively openable and closable cover for said rotor comprising a plurality of elongated fins having arcuate cross section, said fins being hinged along one edge, means connected to each fin for pivoting said fins jointly into open and closed position with respect to each other.

10. The aircraft according to claim 9 wherein said plurality of fins are arranged in two sets divided about the longitudinal axis of said aircraft, and said means for jointly opening and closing said fins is adapted to pivot said sets in opposed directions.

11. The aircraft according to claim 10 including a housing mounted on the top of said fuselage, said housing having a slidable door, a parachute located within said housing, a rocket attached to the canopy of said parachute, and actuated by opening of said door, and latch means for automatically opening said door.

12. The aircraft according to claim 9 wherein said cover includes a frame for receiving said fins, said frame being hinged along its rear edge to the fuselage of said aircraft and is provided with means for raising and lowering said frame at its forward edge, to further control the air intake at said rotor chamber.

References Cited
UNITED STATES PATENTS

| | | | |
|---|---|---|---|
| 2,324,045 | 7/1943 | Vallinos | 244—139 |
| 2,955,780 | 10/1960 | Hulbert | 244—23 |
| 2,969,937 | 1/1961 | Trojahn | 244—23(X) |
| 2,990,139 | 6/1961 | Ramnisceanu | 244—23(X) |
| 3,130,939 | 4/1964 | Alper et al. | 244—2 |
| 3,322,223 | 5/1967 | Bertelsen | 244—2(X) |
| 3,265,329 | 9/1966 | Postelson-Apostolescu | 244—2 |
| 3,481,559 | 12/1969 | Postelson-Apostolescu | 244—2 |

MILTON BUCHLER, Primary Examiner

C. A. RUTLEDGE, Assistant Examiner